United States Patent [19]
Harpole et al.

[11] Patent Number: 5,961,309
[45] Date of Patent: Oct. 5, 1999

[54] GEAR PUMP WITH NOISE ATTENUATION

[75] Inventors: George M. Harpole, Torrance; Michael B. Petach, Redondo Beach; Nelson P. Mark, Long Beach, all of Calif.

[73] Assignee: TRW Inc., Lyndhurst, Ohio

[21] Appl. No.: 08/847,571

[22] Filed: Apr. 24, 1997

[51] Int. Cl.[6] .................. F04C 2/18; F04C 15/00
[52] U.S. Cl. ............ 418/181; 418/206.1; 417/540
[58] Field of Search ................. 418/181, 206.1, 418/206.4; 417/540

[56] References Cited

U.S. PATENT DOCUMENTS

| | | | |
|---|---|---|---|
| 1,093,151 | 4/1914 | Seck | 418/206.1 |
| 3,055,307 | 9/1962 | Thrap | 418/132 |
| 3,171,359 | 3/1965 | Spencer et al. | 418/131 |
| 3,360,193 | 12/1967 | Harris et al. | 417/312 |
| 3,841,804 | 10/1974 | Drutchas et al. | 418/131 |
| 3,909,165 | 9/1975 | Laumont | 418/102 |
| 4,174,196 | 11/1979 | Mori et al. | 418/181 |
| 4,239,461 | 12/1980 | Elson | 417/312 |
| 4,330,239 | 5/1982 | Gannaway | 417/312 |
| 4,486,160 | 12/1984 | Lipscombe | 418/205 |
| 4,580,651 | 4/1986 | Adams | 180/422 |
| 4,645,026 | 2/1987 | Adams | 180/442 |
| 4,651,841 | 3/1987 | Adams | 180/422 |
| 4,669,568 | 6/1987 | Kervagoret | 180/422 |
| 4,730,695 | 3/1988 | Bar | 181/252 |
| 4,752,195 | 6/1988 | Friedrich et al. | 417/540 |
| 4,921,477 | 5/1990 | Davis | 417/540 |
| 5,240,393 | 8/1993 | Laumont | 418/132 |
| 5,401,150 | 3/1995 | Brown | 418/181 |
| 5,692,883 | 12/1997 | Vourc'h | 418/181 |

FOREIGN PATENT DOCUMENTS

| | | | |
|---|---|---|---|
| 7541 | 11/1927 | Australia | 418/206 |
| 0748939 | 12/1996 | European Pat. Off. . | |
| 555154 | 7/1932 | Germany | 418/181 |
| 61-286594 | 12/1986 | Japan | 418/181 |

OTHER PUBLICATIONS

SAE Technical Paper Series, 801005 "New Methods of Reducing Noise in External Gear Pumps", Hobbs et al., 1980.

Primary Examiner—John J. Vrablik
Attorney, Agent, or Firm—Tarolli, Sundheim, Covell, Tummino & Szabo

[57] ABSTRACT

An apparatus comprises a reservoir (14) containing hydraulic fluid (68), a gear pump (16) with a suction hole (74), and a hydraulic muffler (18). The gear pump (16) has gears (78) with meshing teeth (80) that convey a flow of hydraulic fluid (68) from the reservoir (14) into the pump (16) through the suction hole (74). The muffler (18) attenuates noise by damping flow rate fluctuations that are caused by the meshing gear teeth (80). The muffler (18) includes a compliant element (92) and a fluid inertia structure (90) interposed between the suction hole (74) and the fluid (68) in the reservoir (14). The inertia structure (90) responds to the flow rate fluctuations by directing corresponding hydraulic pressure fluctuations to deflect the compliant element (92). As a result, noise is attenuated upon deflection of the compliant element (92).

42 Claims, 3 Drawing Sheets

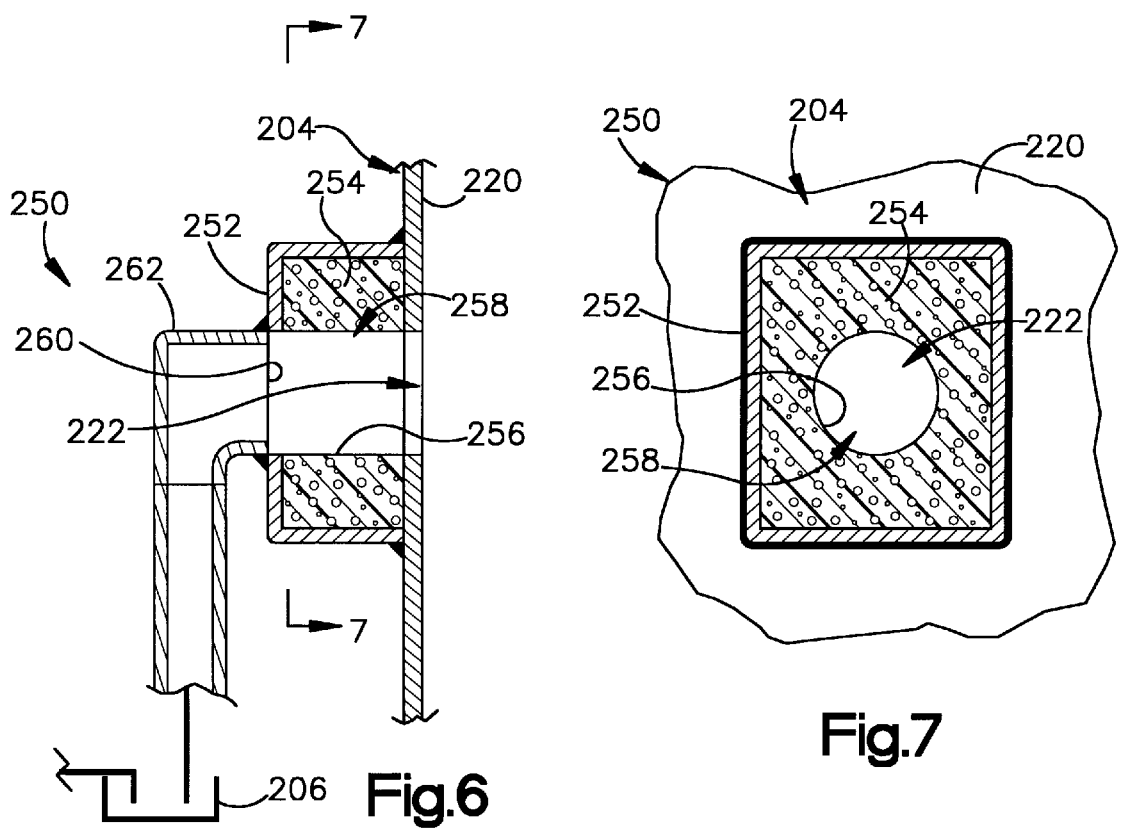
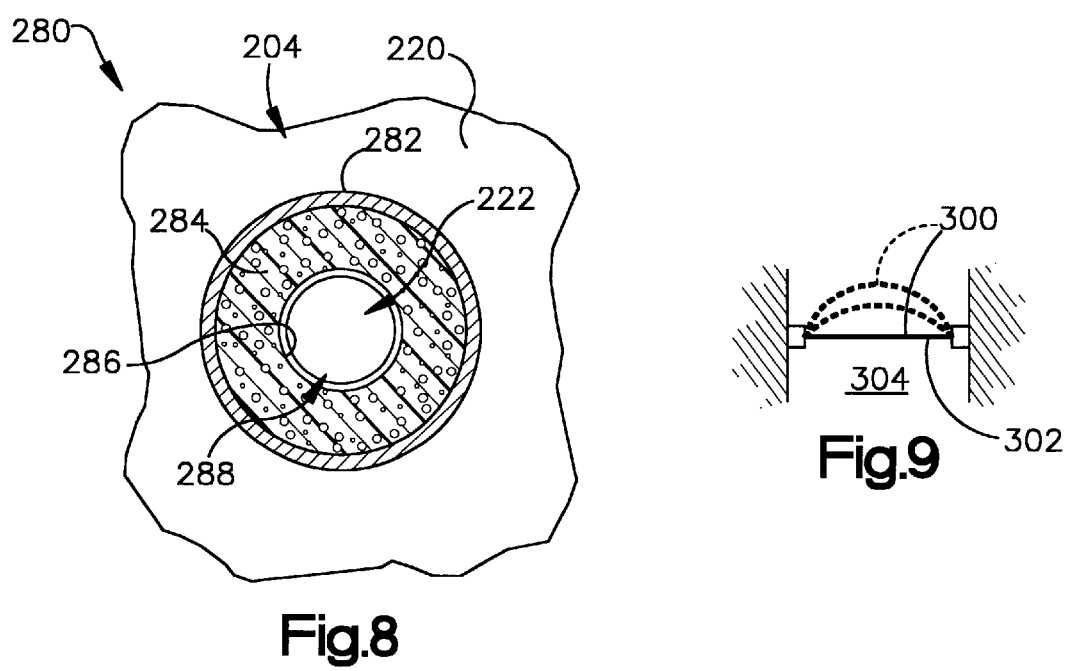

GEAR PUMP WITH NOISE ATTENUATION

FIELD OF THE INVENTION

The present invention relates to a gear pump in which rotating gears convey a flow of hydraulic fluid.

BACKGROUND OF THE INVENTION

A gear pump is a particular type of pump in which a pair of rotating gears move hydraulic fluid. More specifically, the gears have meshing teeth that convey a flow of hydraulic fluid into and through the pump along flow paths extending circumferentially around the gears.

The hydraulic fluid is drawn into the gear pump through a suction hole. When the gears rotate, the gear teeth cause flow rate fluctuations as they move into and out of meshing engagement between the gears. The flow rate fluctuations propagate outward from the suction hole. Corresponding fluctuations in the hydraulic fluid pressure can cause noise. Such noise can be especially undesirable when the gear pump is used in a hydraulic power steering system for a vehicle.

SUMMARY OF THE INVENTION

In accordance with the present invention, an apparatus comprises a reservoir containing hydraulic fluid, a gear pump with a suction hole, and a hydraulic muffler. The gear pump has gears with meshing teeth that convey a flow of hydraulic fluid from the reservoir into the pump through the suction hole. The muffler attenuates noise by damping flow rate fluctuations that are caused by the meshing gear teeth.

The muffler includes a compliant element and a fluid inertia means interposed between the suction hole and the fluid in the reservoir. The fluid inertia means responds to the flow rate fluctuations by directing corresponding hydraulic pressure fluctuations to deflect the compliant element. As a result, noise is attenuated upon deflection of the compliant element.

BRIEF DESCRIPTION OF THE DRAWINGS

Further features of the present invention will become apparent to those skilled in the art to which the present invention relates from reading the following description with reference to the accompanying drawings, in which:

FIG. 6 is a view of parts of an apparatus comprising a third embodiment of the present invention;

FIG. 7 is a view taken on line 7—7 of FIG. 6;

FIG. 8 is a view of parts of an apparatus comprising a fourth embodiment of the present invention; and FIG. 9 is a view of parts of an apparatus comprising a fifth embodiment of the present invention.

DESCRIPTION OF PREFERRED EMBODIMENTS

Figure 1:
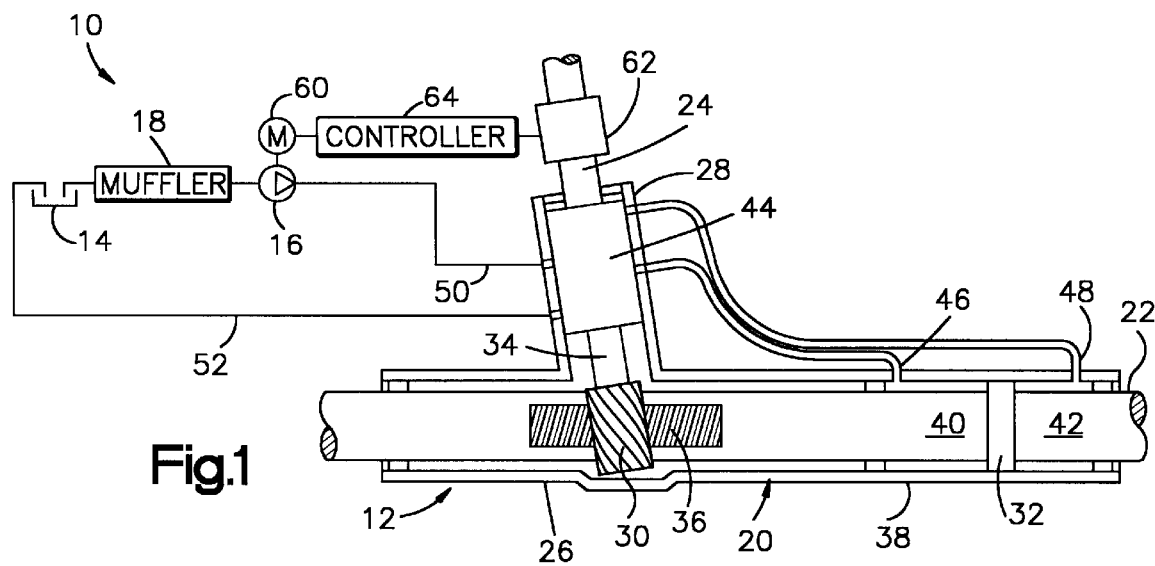
FIG. 1 is a schematic view of an apparatus comprising a first embodiment of the present invention.

An apparatus 10 comprising a first embodiment of the present invention is shown schematically in FIG. 1. The apparatus 10 is a vehicle steering system including a hydraulically-assisted rack and pinion steering gear 12. The system 10 further includes a hydraulic fluid reservoir 14 and a gear pump 16 for pumping hydraulic fluid from the reservoir 14 to the steering gear 12. A hydraulic muffler 18 is interposed between the pump 16 and the reservoir 14.

As described below, the pump 16 has gears with meshing teeth that convey a flow of hydraulic fluid into and through the pump 16. When the gears rotate, the meshing gear teeth cause fluctuations in the flow rate. The fluctuations occur at frequencies that vary with the speed of the rotating gears. As further described below, the muffler 18 functions in a manner analogous to an inductance-capacitance (LC) filter in an electrical circuit. The muffler 18 thus functions to attenuate noise by damping the flow and pressure fluctuations that are caused by the meshing gear teeth in the pump 16.

The steering gear 12 includes a housing 20, an elongate steering rack 22, and an input shaft 24. The rack 22 extends longitudinally through a lower portion 26 of the housing 20, and is supported for longitudinal movement relative to the housing 20. When the steering gear 12 is installed in a vehicle, the opposite ends (not shown) of the rack 22 are connected to steering linkages which, in turn, connect the steering gear 12 to a pair of steerable vehicle wheels. The input shaft 24 projects outward from an upper portion 28 of the housing 20, and is rotatable in response to rotation of the vehicle steering wheel (not shown).

Other parts of the steering gear 12 include a pinion gear 30 and a piston 32. The pinion gear 30 is connected with the input shaft 24 by a torsion bar 34, and is supported for rotation in meshing engagement with a row of rack teeth 36 on the rack 22. A tubular section 38 of the lower housing portion 26 functions as a power cylinder. The piston 32 is fixed to the rack 22 within the power cylinder 38. A pair of variable volume hydraulic fluid chambers 40 and 42 are located in the power cylinder 38 on opposite sides of the piston 32.

A hydraulic fluid control valve 44 is contained in the upper portion 28 of the housing 20. The valve 44 communicates with the first chamber 40 in the power cylinder 38 through a first two-way conduit 46. The valve 44 communicates with the second chamber 42 in the power cylinder 38 through a second two-way conduit 48. As further shown schematically in FIG. 1, the valve 44 receives hydraulic fluid from the pump 16 through a supply conduit 50. A return conduit 52 exhausts hydraulic fluid from the valve 44 to the reservoir 14.

The valve 44 operates in response to rotation of the input shaft 24 with the vehicle steering wheel. When the input shaft 24 rotates with the steering wheel in a first direction, it rotates slightly relative to the pinion gear 30. The torsion bar 34 twists to permit such rotation of the input shaft 24 relative to the pinion gear 30. The valve 44 responds to the resulting rotational displacement by opening hydraulic fluid flow paths that extend through the valve 44 from the supply conduit 50 to the first two-way flow conduit 46. The valve 44 simultaneously opens hydraulic fluid flow paths that extend through the valve 44 from the second two-way flow conduit 48 to the return conduit 52. As a result, the valve 44 communicates the pump 16 with the first chamber 40 in the power cylinder 38 to pressurize the first chamber 40, and simultaneously communicates the second chamber 42 in the power cylinder 38 with the reservoir 14 to exhaust the second chamber 42. A resulting flow of hydraulic fluid from the pump 16, and a resulting hydraulic fluid pressure differential acting across the piston 32, cause the piston 32 and the rack 22 to move to the right, as viewed in FIG. 1. This causes the steering linkage to steer the vehicle wheels in a first direction.

As the rack 22 moves with the piston 32, the pinion gear 30 rotates in meshing engagement with the rack teeth 36. The pinion gear 32 thus rotates relative to the input shaft 24 in a follow-up manner so as to cancel the rotational displacement between the pinion gear 30 and the input shaft 24. The valve 44 responds by closing the previously opened hydraulic fluid flow paths. This equalizes the hydraulic fluid pressures acting on the piston 32 in the two chambers 40 and 42 in the power cylinder 38, and causes the piston 32 and the rack 22 to stop moving.

When the vehicle wheels are to be steered in an opposite direction, the input shaft 24 is rotated with the steering wheel in an opposite direction, and is again rotated slightly relative to the pinion gear 30 upon twisting of the torsion bar 34. The valve 44 responds by pressurizing the second chamber 42 and by simultaneously exhausting the first chamber 40. The piston 32 and the rack 22 then move to the left, as viewed in FIG. 1. A resulting follow-up rotation of the pinion gear 30 relative to the input shaft 24 causes the valve 44 again to equalize the hydraulic fluid pressures in the two chambers 40 and 42 in the power cylinder 38. The steering gear 12 thus steers the vehicle wheels in directions and amounts corresponding to the directions and the amounts of rotation of the steering wheel and the input shaft 24.

The steering system 10 is an electric power hydraulic steering (EPHS) system. The steering system 10 thus includes an electric motor 60 which drives the pump 16 in response to a predetermined vehicle condition. The predetermined vehicle condition in the first embodiment of the present invention is the steering input, as indicated by a torque sensor 62. As known in the art, any other suitable vehicle condition, such as vehicle speed, also could be used. When a signal from the torque sensor 62 indicates that torque in the input shaft 24 has reached a predetermined level, a controller 64 (which may comprise a microprocessor of known construction) energizes the motor 60 so as to cause the pump 16 to provide the valve 44 with hydraulic fluid flow rates and pressures that are sufficient to move the piston 32 in the manner described above.

Figure 2:
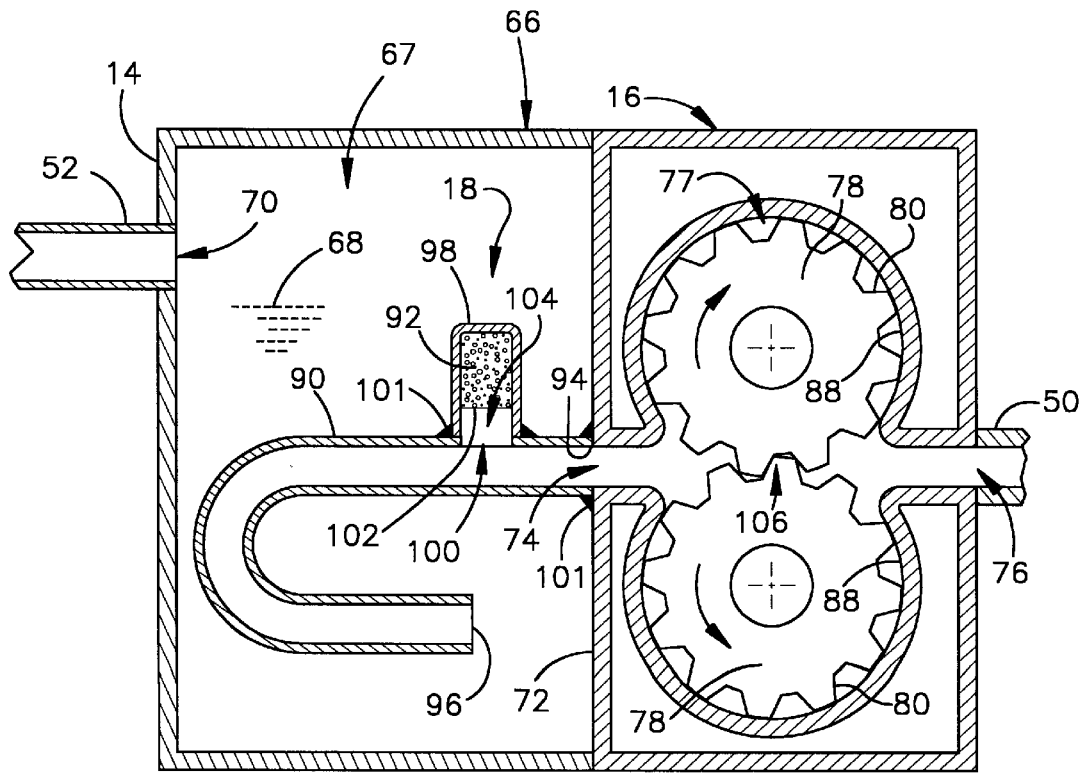
FIG. 2 is a schematic view showing parts of the apparatus of FIG. 1 in greater detail.

As shown in somewhat greater detail in the schematic view of FIG. 2, the pump 16 and the reservoir 14 are constructed as adjoining parts of a single unit 66. The reservoir 14 has a storage chamber 67 containing hydraulic fluid 68, and has a return port 70 which receives hydraulic fluid from the return conduit 52. The pump 16 has a housing 72 with a suction hole 74, an outlet port 76, and a pumping chamber 77. The muffler 18 is mounted over the suction hole 74 at the exterior of the pump housing 72, and is contained within the storage chamber 67.

A pair of gears 78 with meshing gear teeth 80 are supported for rotation in the pumping chamber 77. When the gears 78 are rotated in the directions indicated by the arrows shown in FIG. 2, hydraulic fluid is moved through the pumping chamber 77 in the spaces between the gear teeth 80 and the surrounding surfaces 88 of the housing 72. A flow of hydraulic fluid is then conveyed through the pump 16 from the suction hole 74 to the outlet port 76 along flow paths extending circumferentially around the gears 78.

The muffler 18 includes a conduit 90 and a compliant element 92. The conduit 90 has an inner end 94 received over the suction hole 74, and has an outer end 96 immersed in the fluid 68 in the storage chamber 67. The conduit 90 at least partially forms a channel along which a flow of hydraulic fluid is conducted. The compliant element 92 is located within a fluid retention cup 98 which is mounted over an aperture or opening 100 in the conduit 90 adjacent to the suction hole 74.

Although its shape may vary, the retention cup 98 in the first embodiment of the invention is a generally cylindrical part projecting longitudinally from the conduit 90 in a direction perpendicular to the direction in which the hydraulic fluid normally flows past the aperture 100 toward the suction hole 74. The conduit 90, the pump housing 72 and the retention cup 98 can be fixed and sealed together in any suitable manner known in the art, such as by the use of epoxy bonds 101.

The compliant element 92 in the first embodiment of the invention is a cylindrical plug received closely within the retention cup 98. A circular end surface 102 of the compliant element 92 extends fully across the inside of the retention cup 98 at a location spaced a short distance from the aperture 100. The compliant element 92 is formed of an elastomeric material, such as rubber, and has a closed-cell foam structure which is compressible under the force of hydraulic fluid pressure acting against the end surface 102. The retention cup 98 and the compliant element 92 thus define a variable volume fluid retention chamber or cavity 104 between the end surface 102 of the compliant element 92 and the aperture 100 in the conduit 90.

When the gears 78 rotate, as noted above, the meshing gear teeth 80 cause fluctuations in the hydraulic fluid flow rate. Those fluctuations occur at frequencies that vary with the frequency at which the gear teeth 80 move into and out of meshing engagement at the nip 106 between the gears 78, and then propagate outward from the suction hole 74 at harmonics of the gear tooth frequency. However, such propagation of the flow rate fluctuations is resisted by the inertia of the fluid flowing through the conduit 90 toward the suction hole 74. Accordingly, the inertia of that volume of fluid resists transmission of the flow rate fluctuations from the suction hole 74 to the fluid 68 in the storage chamber 67 in a manner analogous to the inductance L in an electrical LC filter.

By inhibiting the flow rate fluctuations in the foregoing manner, the conduit 90 induces corresponding fluctuations in the fluid pressure at the suction hole 74. For example, when the conduit 90 inhibits a decreasing flow rate, it induces back pressure at the suction hole 74. The back pressure at the suction hole 74 causes a corresponding increase in the pressure acting against the end surface 102 of the compliant element 92. The compliant element 92 becomes compressed within the retention cup 98 under the force of the increasing fluid pressure acting against the end surface 102. The volume of the retention chamber 104 becomes enlarged by a corresponding amount, and an equal volume of hydraulic fluid flows into the enlarged volume of the retention chamber 104. The compliant element 92 thus provides a fluid retention volume which is analogous to the capacitance C in an electrical LC filter. A small volume of hydraulic fluid is thus diverted from the flow moving into and through the pump 16 in response to a decrease in the flow rate. This reduces the amount of back pressure transmitted through the conduit 90 to the fluid 68 in the storage chamber 67, and eliminates the noise that would otherwise be caused by transmission of a greater amount of back pressure to the fluid 68 in the storage chamber 67.

When the flow rate subsequently increases, the back pressure at the suction hole 74, as well as the pressure acting against the end surface 102 of the compliant element 92, decreases. A corresponding volume of hydraulic fluid which had previously flowed into the enlarged volume of the retention chamber 104 is then discharged from the retention chamber 104 and reintroduced into the conduit 90 as the compliant element 92 relaxes and expands toward the aperture 100. This helps to sustain the increasing flow rate into the pump 16, and eliminates the noise that would otherwise result from a greater decrease in the back pressure at the suction hole 74.

The arrangement of the muffler 18 and the gear pump 16 could differ from that shown schematically in FIG. 2. However, the compliant element 92 is preferably located as closely as possible to the suction hole 74, i.e., the length of the flow path between the suction hole 74 and the aperture 100 leading to the retention chamber 104 is preferably minimized.

The "inductance" provided by the muffler 18 can be varied by varying the length and/or the cross-sectional shape or flow area of the conduit 90 between the compliant element 92 and the open end 96 of the conduit 90. In accordance with this feature of the invention, the length and flow area are preferably selected to have a large ratio of length to area, and thereby to provide a large fluid inertia, while also having a small ratio of length to area squared, and thereby to provide a low pressure drop. For example, a preferred conduit could have a length of about 200 mm and a flow area of about 50 mm².

The "capacitance" provided by the compliant element 92 also can be varied, such as by varying the compressibility of the compliant element 92 or the volume of the retention chamber 104. Moreover, the compliant element 92 could have an initial, unstressed condition in which the end surface 102 extends across the aperture 100 in the conduit 90, rather than being spaced from the aperture 100 as shown in FIG. 2. A corresponding retention chamber would then be provided within the retention cup 98 each time the compliant element 92 compresses in response to a decrease in the flow rate.

Figure 3:
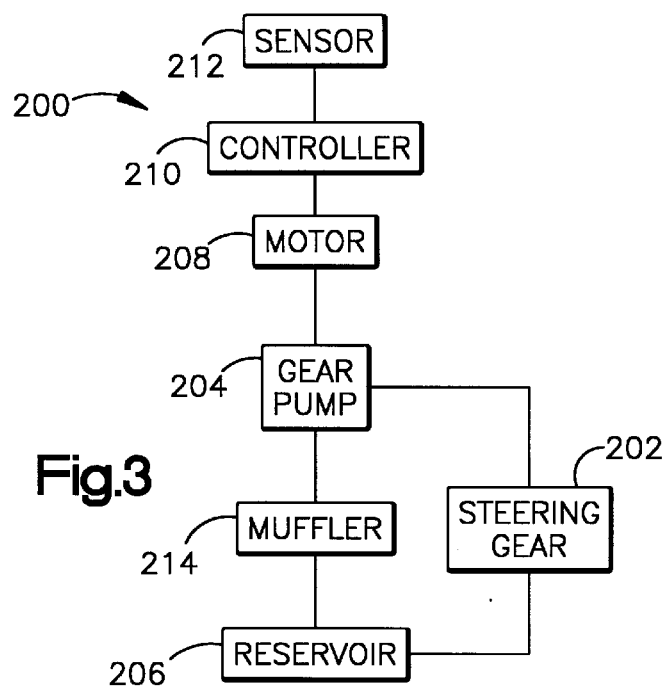
FIG. 3 is a block diagram of an apparatus comprising a second embodiment of the present invention.
Figures 4, 5:
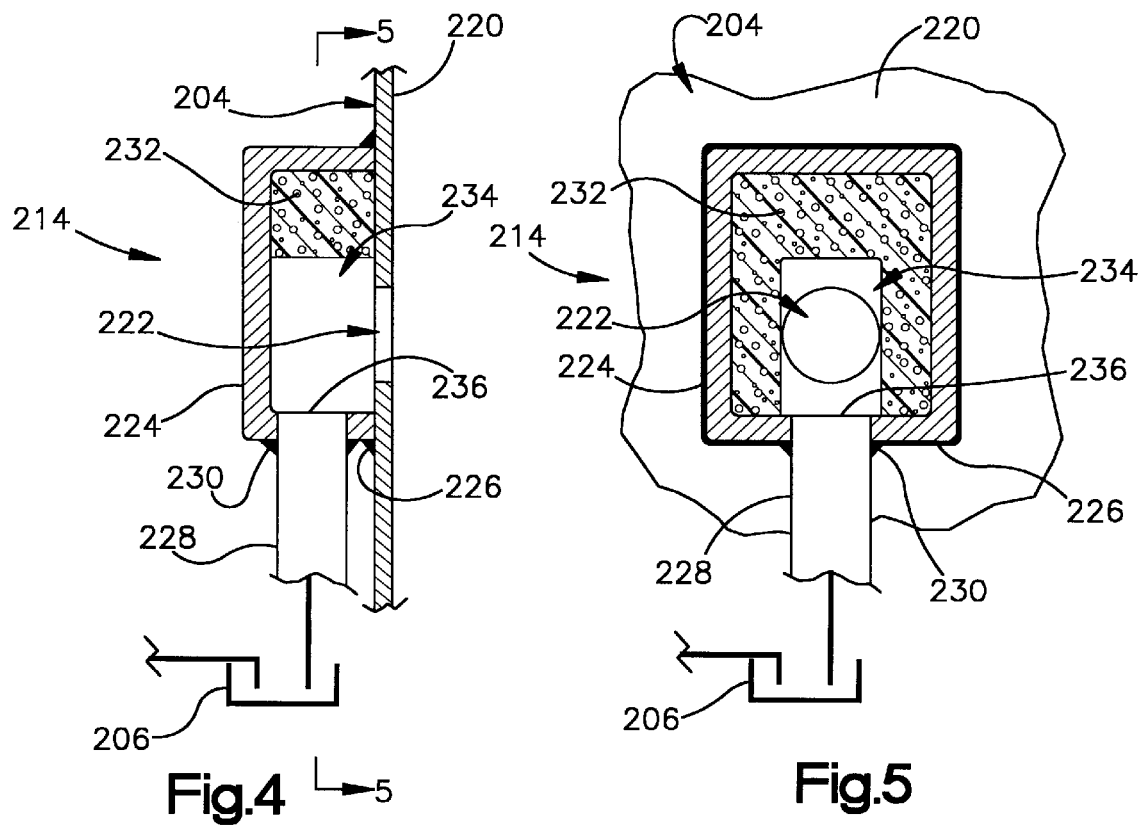
FIG. 4 is a view of parts of the apparatus of FIG. 3.
FIG. 5 is a view taken on line 5—5 of FIG. 4.

A vehicle steering system 200 comprising a second embodiment of the present invention is shown schematically in FIGS. 3–5. Like the steering system 10 described above, the steering system 200 is an EPHS system including a hydraulic power steering gear 202, a gear pump 204 which pumps hydraulic fluid from a reservoir 206 to the steering gear 202, and an electric motor 208 which drives the pump 204. A controller 210 operates the motor 208 in response to a vehicle condition sensor 212. A hydraulic muffler 214 is interposed between the reservoir 206 and the pump 204.

As shown partially in FIGS. 4 and 5, the pump 204 has a housing wall 220 with a suction hole 222. The muffler 214 includes a rectangular retention box 224 which is mounted on the housing wall 220 over the suction hole 222. An epoxy bond 226 extending around the periphery of the retention box 224 fixes and seals the retention box 224 to the housing wall 220. The muffler 214 further includes a conduit 228 extending from the fluid in the reservoir 206 to the retention box 224. Another epoxy bond 230 fixes and seals the conduit 228 to the retention box 224.

The retention box 224 contains a compliant element 232 in the form of a U-shaped, closed cell foam rubber structure extending partially around the suction hole 222 along three sides of the retention box 224. The compliant element 232 and the retention box 224 thus define a rectangular fluid flow space 234 within the retention box 224 between the suction hole 222 and the inner end 236 of the conduit 228.

As in the first embodiment of the invention described above, the conduit 228 in the second embodiment responds to flow rate fluctuations at the suction hole 222 by alternately increasing and decreasing back pressure at the suction hole 222. Corresponding fluid pressure fluctuations in the flow space 234 cause the compliant element 232 to compress and relax such that hydraulic fluid is alternately diverted from, and reintroduced to, the flow moving through the space 234 from the conduit 228 to the suction hole 222. This has a damping effect on the pressure fluctuations that are transmitted through the conduit 228 to the reservoir 206, and noise is attenuated accordingly.

In a third embodiment of the present invention, the EPHS system 200 of FIG. 3 has an alternative muffler 250, as shown in FIGS. 6 and 7, in place of the muffler 240 of FIGS. 4 and 5. The muffler 250 includes a rectangular retention box 252 containing a compliant element 254 in the form of a closed cell foam rubber structure surrounding the suction hole 222. Preferably, the compliant element 254 has a cylindrical inner surface 256 closely surrounding the suction hole 222 so as to define a cylindrical fluid flow space 258 within the retention box 252. The fluid flow space 258 extends between the suction hole 222 and the inner end 260 of a corresponding muffler conduit 262 which leads from the fluid in the reservoir 206 to the retention box 252.

In a fourth embodiment of the present invention, the EPHS system 200 of FIG. 3 includes another alternative muffler 280, as shown partially in FIG. 8, in place of the muffler 240 or the alternative muffler 250. The partial view of the muffler 280 shown in FIG. 8 corresponds with the partial view of the muffler 250 shown in FIG. 7. The muffler 280 is thus shown to include a circular retention box 282 containing a compliant element 284 in the form of an annular, closed cell foam rubber structure surrounding the suction hole 222. Like the compliant element 254 of FIGS. 6 and 7, the compliant element 284 of FIG. 8 has a cylindrical inner surface 286 defining a cylindrical fluid flow space 288 adjoining the suction hole 222 at the outside of the pump housing wall 220.

A fifth embodiment of the present invention is shown partially in the schematic view of FIG. 9. In the fifth embodiment, the compressible compliant element 100 of FIG. 2 is replaced with a diaphragm 300. The diaphragm 300 is deflectable, as indicated in dashed lines in FIG. 9, under the force of hydraulic fluid pressure acting against a surface 302 of the diaphragm 300. The diaphragm 300 thus deflects so as to vary the volume of an adjoining hydraulic fluid retention chamber 304 in the same manner that the compliant element 100 compresses to vary the volume of the retention chamber 104.

From the foregoing description of the invention, those skilled in the art will perceive improvements, changes and modifications. For example, each of the conduits described above is a rigid metal tube. Such a structure is preferred for its ability to block pressure fluctuations from propagating radially outward to the surrounding fluid in the reservoir, but a sufficiently rigid plastic tube could be used as an alternative. Another alternative conduit structure could comprise a two part casing, with a serpentine channel in one part (formed by valleys and ridges) being sealed by a flat cover plate. Such improvements, changes and modifications within the skill of the art are intended to be covered by the appended claims.

Having described the invention, the following is claimed:

1. Apparatus comprising:

a reservoir containing hydraulic fluid;

a gear pump having gears with meshing teeth that convey a flow of hydraulic fluid into said pump through a suction hole; and a hydraulic muffler which attenuates noise by damping flow rate fluctuations caused by said meshing gear teeth;

said muffler including a resiliently compressible element and a fluid inertia means interposed between said suction hole and said fluid in said reservoir, said fluid inertia means responding to said flow rate fluctuations by conducting corresponding hydraulic pressure fluctuations to effect resilient compression and expansion of said resiliently compressible element between a first volume and a second volume which is smaller than said first volume under the influence of the hydraulic pressure fluctuations, whereby said noise is attenuated upon compression of said resiliently compressible element by the hydraulic pressure fluctuations resulting from flow rate fluctuations caused by said meshing gear teeth.

2. Apparatus as defined in claim 1 wherein said fluid inertia means includes hydraulic fluid in a channel extending between said suction hole and said fluid in said reservoir so as to inhibit transmission of said flow rate fluctuations from said suction hole to said fluid in said reservoir.

3. Apparatus as defined in claim 1 wherein said resiliently compressible element defines a movable boundary of a variable volume hydraulic fluid retention chamber which alternately collects and discharges hydraulic fluid during compression and expansion of said resiliently compressible element in response to said fluctuations in said flow rate.

4. Apparatus as defined in claim 1 wherein said reservoir contains said hydraulic fluid in a storage chamber, said muffler also being at least partially contained in said storage chamber.

5. Apparatus as defined in claim 1 wherein said resiliently compressible element has a closed cell foam structure.

6. Apparatus as defined in claim 1 wherein said resiliently compressible element extends at least part way around said suction hole.

7. Apparatus as defined in claim 1 wherein said resiliently compressible element surrounds said suction hole.

8. Apparatus as set forth in claim 1 wherein said resiliently compressible element is free of exposure to forces tending to compress said resiliently compressible element other than hydraulic pressure fluctuations resulting from flow rate fluctuations caused by said meshing gear teeth.

9. Apparatus as set forth in claim 1 wherein said resiliently compressible element includes an elastomer.

10. Apparatus as set forth in claim 1 wherein said resiliently compressible element is disposed in a cavity which is offset to one side of a channel through which a flow of hydraulic fluid is conducted from said reservoir to said suction hole.

11. Apparatus as set forth in claim 10 wherein said resiliently compressible element is free of exposure to forces tending to compress said resiliently compressible element other than hydraulic pressure fluctuations conducted from said channel to said cavity.

12. Apparatus as set forth in claim 11 wherein said cavity is connected with a portion of said channel which is spaced from said gear pump by a distance which is greater than a width of said channel at a location where said cavity is connected in fluid communication with said channel.

13. Apparatus comprising:
a reservoir containing hydraulic fluid;
a gear pump having gears with meshing teeth that induce a flow of hydraulic fluid into said pump through a suction hole at a first pressure and induce a flow of hydraulic fluid from said pump at a second pressure which is greater than the first pressure;

a hydraulic muffler which is connected in fluid communication with said reservoir and said gear pump, said hydraulic muffler being effective to attenuate noise by damping flow rate fluctuations caused by said meshing gear teeth;

said hydraulic muffler includes a channel through which hydraulic fluid from said reservoir is conducted to said suction hole, a cavity which is offset from a flow of hydraulic fluid through said channel and is connected in fluid communication with said channel, said cavity is free of connections to sources of fluid other than the flow of fluid through said channel, and a compliant element disposed in said cavity and exposed to fluid pressure in said cavity, said compliant element being movable under the influence of fluid pressure fluctuations resulting from flow rate fluctuations caused by said meshing gear teeth to enable hydraulic fluid to flow from the flow of hydraulic fluid in said channel into said cavity and to discharge hydraulic fluid from said cavity into the flow of hydraulic fluid in said channel.

14. Apparatus as set forth in claim 13 wherein said channel has an end portion connected in fluid communication with said reservoir to enable fluid in said reservoir to enter said channel, said channel having a bend portion disposed between said end portion of said channel and said suction hole, said cavity being connected in fluid communication with said channel at a location disposed downstream of the flow of hydraulic fluid into said end portion of said channel.

15. Apparatus as set forth in claim 13 wherein said channel has a curving portion with an arcuate extent of at least 180 degrees.

16. Apparatus as set forth in claim 13 wherein said compliant element at least partially defines a movable boundary of said cavity, said boundary of said cavity being movable in one direction to provide for a flow of hydraulic fluid from said channel into said cavity in response to a decrease in hydraulic fluid flow during flow rate fluctuations caused by said meshing gear teeth, said boundary of said cavity being movable in a direction opposite to the one direction to provide for a flow of hydraulic fluid from said cavity into said channel in response to an increase in hydraulic fluid flow during flow rate fluctuations caused by said meshing gear teeth.

17. Apparatus as set forth in claim 13 wherein said reservoir contains hydraulic fluid in a storage chamber, said hydraulic muffler being at least partially disposed in said storage chamber.

18. Apparatus as set forth in claim 13 wherein said compliant element is a diaphragm which is exposed to fluid pressure in said cavity.

19. Apparatus as set forth in claim 13 wherein said compliant element has a structure which is compressible under the influence of hydraulic fluid pressure fluctuations caused by said meshing gear teeth.

20. Apparatus as set forth in claim 13 wherein said compliant element is formed of a resiliently compressible material having a closed cell structure.

21. Apparatus as set forth in claim 13 wherein at least a portion of said channel is disposed in a tubular conduit and has a curving configuration.

22. Apparatus as set forth in claim 13 wherein said cavity is connected with a portion of said channel which is spaced from said suction hole by a distance which is greater than a width of said channel at a location where said cavity is connected in fluid communication with said channel.

23. Apparatus as set forth in claim 13 wherein said channel is at least partially disposed in a tubular conduit which extends into said reservoir.

24. Apparatus as set forth in claim 13 wherein said cavity is disposed adjacent to said suction hole.

25. Apparatus as set forth in claim 24 wherein said compliant element extends around a portion of said channel.

26. Apparatus as set forth in claim 25 wherein said compliant element has an annular configuration and said channel extends through a central portion of said compliant element.

27. Apparatus as set forth in claim 25 wherein said compliant element has a rectangular configuration, said channel extends through a central portion of said complaint element.

28. Apparatus for use in supplying hydraulic fluid to a vehicle power steering system, said apparatus comprising:

an electric motor;

a gear pump having gears which are connected with and rotated by said electric motor to induce hydraulic fluid to flow into said gear pump at a first pressure and to flow out of said gear pump to the vehicle power steering system at a second pressure which is greater than the first pressure, said gears having meshing teeth which cause fluctuations in a flow of hydraulic fluid being conducted to said gear pump during rotation of said gears by said electric motor; and a hydraulic muffler connected in fluid communication with said gear pump and through which the flow of hydraulic fluid is conducted to said gear pump during rotation of said gears by said electric motor;

said hydraulic muffler includes a channel through which the flow of hydraulic fluid is conducted, a cavity having an opening connected in fluid communication with said channel, and a resiliently compressible material disposed in said cavity and exposed to fluid pressure conducted from said channel, said resiliently compressible material being compressible under the influence of increasing fluid pressure in the fluctuations in flow of hydraulic fluid in said channel during rotation of said gears and being expandable under the influence of the resilience of said resiliently compressible material during decreasing fluid pressure in the fluctuations in flow of hydraulic fluid in said channel during rotation of said gears.

29. Apparatus as set forth in claim 28 wherein said channel has a nonlinear configuration and contains hydraulic fluid having inertia which resists fluctuations in the flow of hydraulic fluid being conducted to said gear pump resulting from the fluctuations in the flow of hydraulic fluid during rotation of said gears by said electric motor.

30. Apparatus as set forth in claim 28 wherein the compressible material is compressed from a first volume to a second volume by increasing fluid pressure in the fluctuations in flow of hydraulic fluid in said channel and wherein the compressible material expands from the second volume to the first volume during decreasing fluid pressure in the fluctuations in flow of hydraulic fluid in said channel.

31. Apparatus as set forth in claim 28 wherein said resiliently compressible material has an annular configuration and said channel extends through an opening in a central portion of said resiliently compressible material.

32. Apparatus as set forth in claim 28 wherein said cavity is connected with a portion of said channel which is spaced from said pump by a distance which is greater than a width of said channel at a location where said cavity is connected in fluid communication with said channel.

33. Apparatus comprising:

a gear pump; and a hydraulic muffler connected with said gear pump and through which a flow of hydraulic fluid is conducted to said gear pump;

said hydraulic muffler includes a channel through which the flow of hydraulic fluid is conducted, a cavity having an opening connected in fluid communication with said channel at a location spaced from said gear pump, and a body of resilient material which is disposed in said cavity, said body of resilient material being compressible from a first volume to a second volume under the influence of increasing fluid pressure in fluctuations induced in the flow of hydraulic fluid in said channel by said gear pump during operation of said gear pump and is expandable from the second volume during decreasing fluid pressure in the fluctuations induced in the flow of hydraulic fluid in said channel by said gear pump during operation of said gear pump.

34. Apparatus as set forth in claim 33 wherein hydraulic fluid is conducted from the flow of hydraulic fluid in said channel into said cavity as said body of resilient material is compressed from the first volume to the second volume and hydraulic fluid is conducted from said cavity to the flow of hydraulic fluid in said channel as said body of resilient material expands from the second volume.

35. Apparatus as set forth in claim 33 wherein said body of resilient material is compressed under the influence of only to fluid pressure conducted from the flow of hydraulic fluid in said channel to said cavity.

36. Apparatus as set forth in claim 33 wherein said gear pump has an opening through which the flow of hydraulic fluid enters said gear pump, said cavity being disposed adjacent to said opening through which the flow of hydraulic fluid enters said gear pump.

37. Apparatus as set forth in claim 33 wherein said body of resilient material has a closed cell structure.

38. Apparatus as set forth in claim 33 wherein said body of resilient material is an elastomer.

39. Apparatus as set forth in claim 33 wherein said cavity is connected with a portion of said channel which is spaced from said gear pump by a distance which is greater than a width of said channel at a location where said cavity is connected in fluid communication with said channel.

40. Apparatus as set forth in claim 33 further including a reservoir which holds a body of hydraulic fluid, said channel being connected in fluid communication with said reservoir.

41. Apparatus as set forth in claim 33 wherein a bend is formed in said channel, said cavity being connected in fluid communication with said channel at a location disposed downstream of the flow of hydraulic fluid through at least a portion of said bend in said channel.

42. Apparatus as set forth in claim 41 wherein said bend in said channel has an arcuate configuration with an extent of at least 180 degrees.

* * * * *